United States Patent
Grupido et al.

(10) Patent No.: US 11,940,056 B2
(45) Date of Patent: Mar. 26, 2024

(54) VEHICLE DRIVELINE COMPONENT WITH PINNED VENT

(71) Applicant: AMERICAN AXLE & MANUFACTURING, INC., Detroit, MI (US)

(72) Inventors: Salvatore N. Grupido, Rochester, MI (US); Mark L. White, Wixom, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 78 days.

(21) Appl. No.: 17/737,521

(22) Filed: May 5, 2022

(65) Prior Publication Data
US 2023/0358330 A1 Nov. 9, 2023

(51) Int. Cl.
*F16K 27/02* (2006.01)
*F16H 57/027* (2012.01)
*F16K 17/02* (2006.01)

(52) U.S. Cl.
CPC ....... *F16K 27/0209* (2013.01); *F16H 57/027* (2013.01); *F16K 17/02* (2013.01)

(58) Field of Classification Search
CPC .... F16K 27/0209; F16K 17/02; F16K 15/147; F16H 57/027
See application file for complete search history.

(56) References Cited

U.S. PATENT DOCUMENTS

| | | | | |
|---|---|---|---|---|
| 4,351,203 A | * | 9/1982 | Fukunaga | F16H 57/0483 74/606 R |
| 4,595,118 A | * | 6/1986 | Azuma | F16H 57/027 74/606 R |
| 4,794,942 A | | 1/1989 | Yasuda et al. | |
| 6,119,713 A | * | 9/2000 | Pino | F16K 31/3855 137/849 |
| 7,517,392 B2 | * | 4/2009 | Neff | F16K 17/19 55/444 |
| 2004/0003846 A1 | * | 1/2004 | Seidl | F16H 57/027 137/493 |
| 2004/0025942 A1 | * | 2/2004 | Kim | F16H 57/027 137/493 |
| 2007/0295158 A1 | | 12/2007 | Adelman et al. | |
| 2019/0360602 A1 | * | 11/2019 | Burke | F16K 17/02 |

FOREIGN PATENT DOCUMENTS

| | | |
|---|---|---|
| DE | 102008057924 A1 | 5/2010 |
| DE | 102015105243 A1 | 10/2015 |
| JP | 2009106024 A * | 5/2009 |

* cited by examiner

*Primary Examiner* — Jessica Cahill
(74) *Attorney, Agent, or Firm* — Reising Ethington P.C.

(57) ABSTRACT

A vehicle driveline component that includes a tubular body, a relief valve, a vent cover and a pin. The tubular body has a first and second axial ends and defines an interior circumferential surface. The relief valve is mounted in the tubular body between the first and second axial ends. The vent cover is mounted to the tubular body and covers the second axial end. The pin is mounted to the tubular body at a location between the first axial end and the relief valve. The pin extends through the interior circumferential surface into a hollow interior of the tubular body.

23 Claims, 4 Drawing Sheets

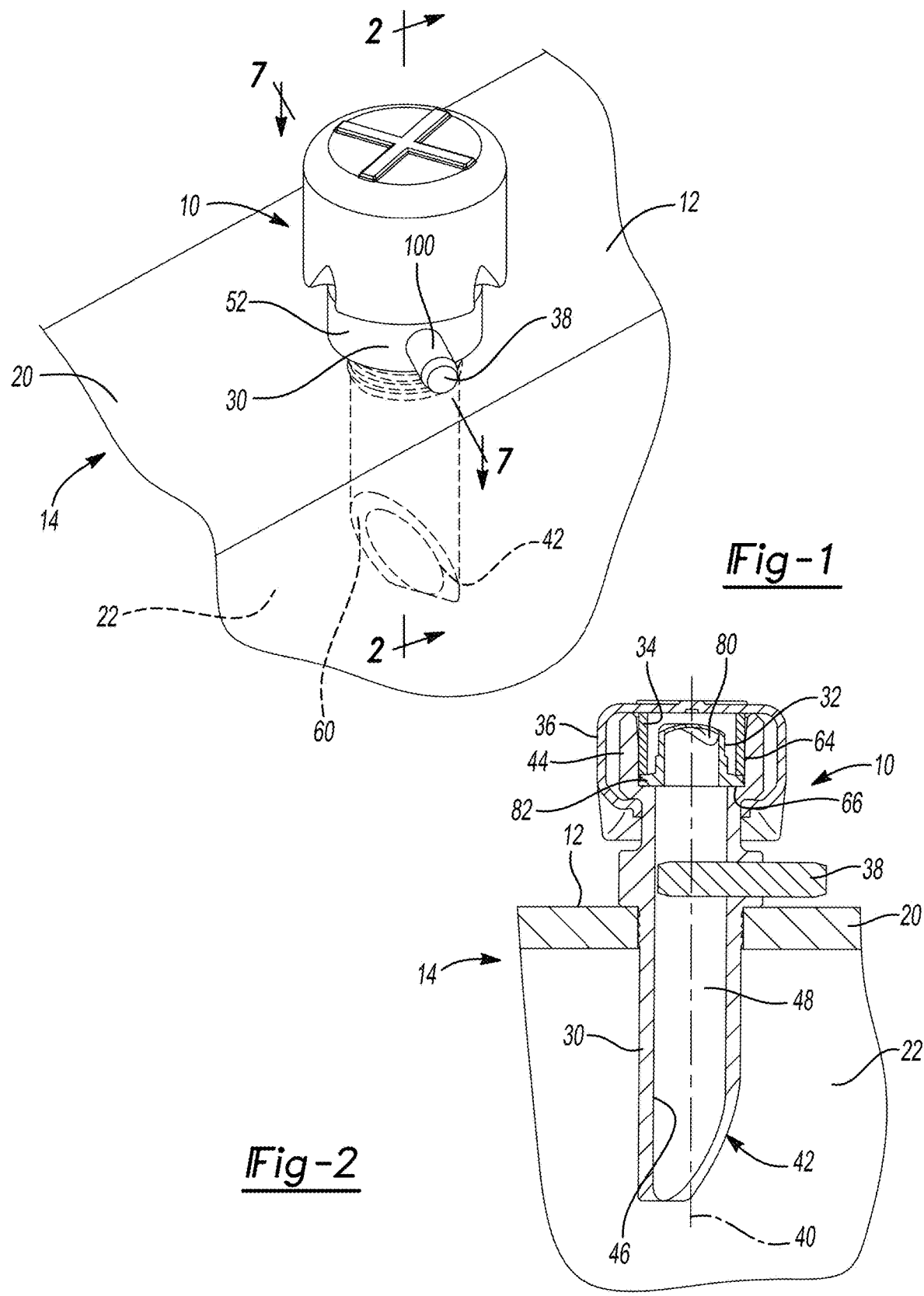

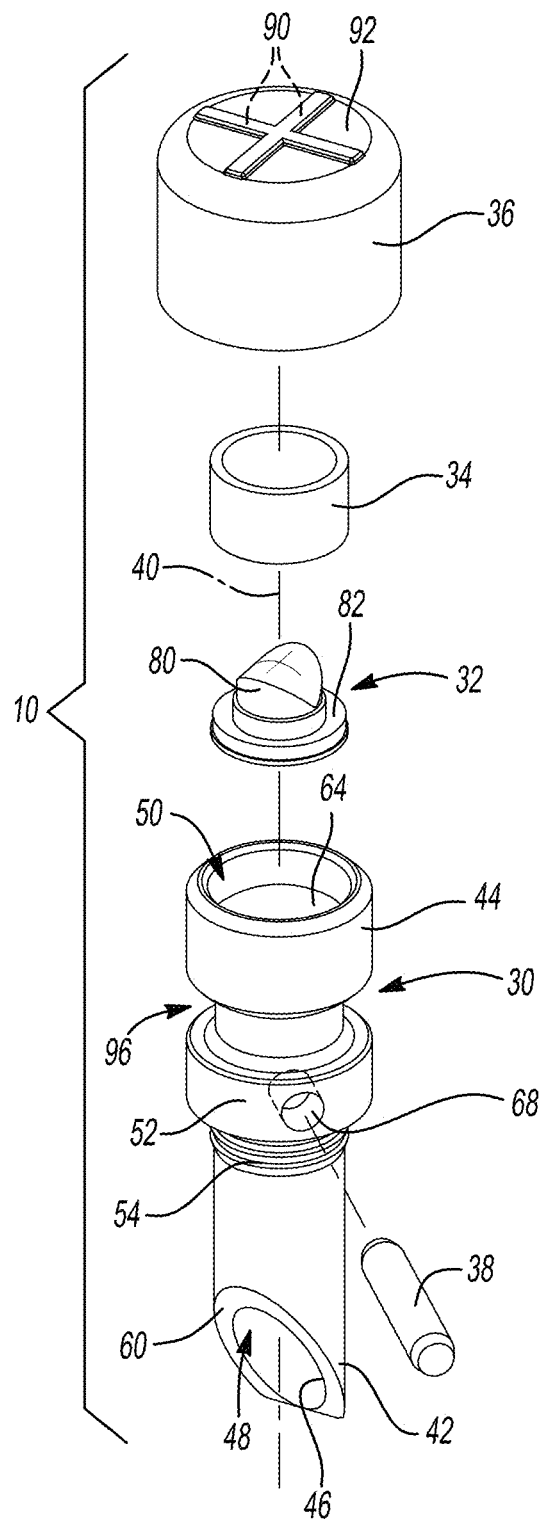
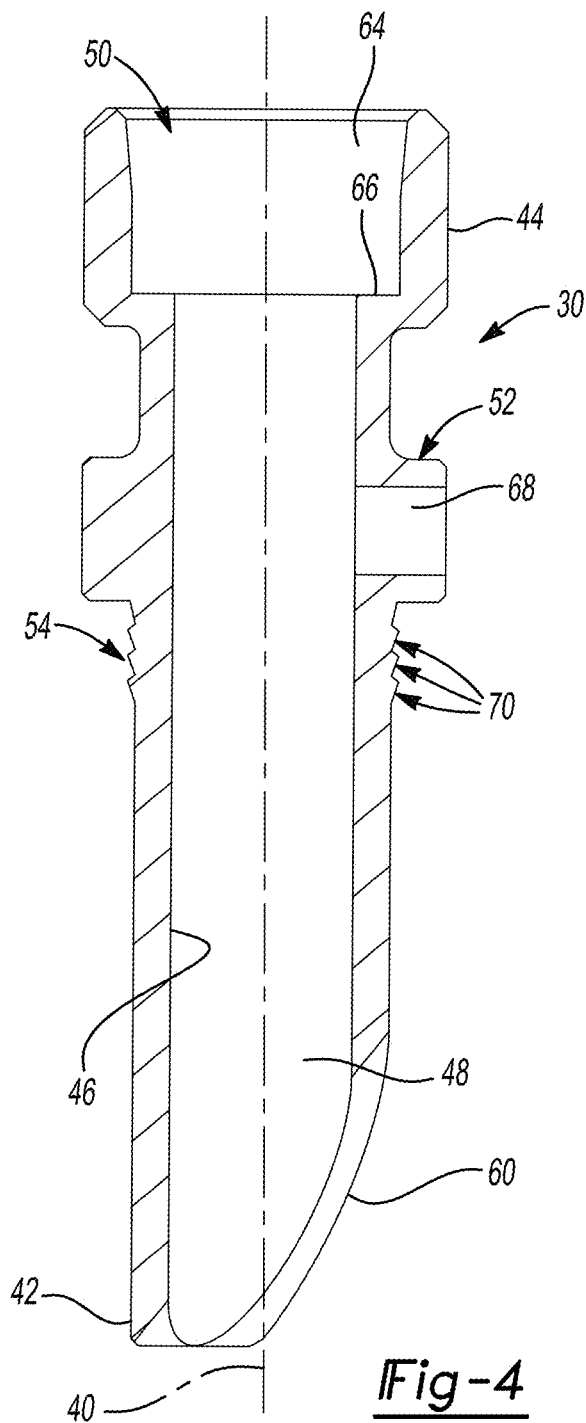
Fig-3
Fig-4

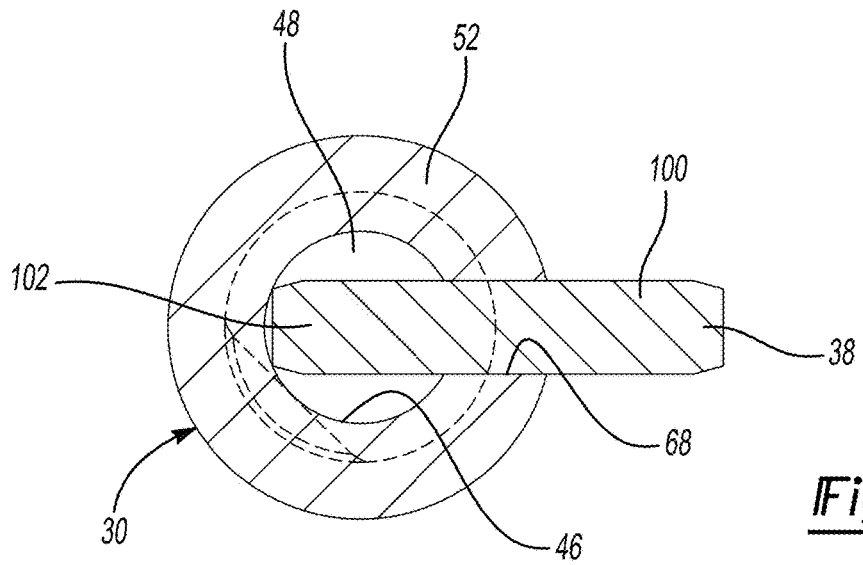
*Fig-7*
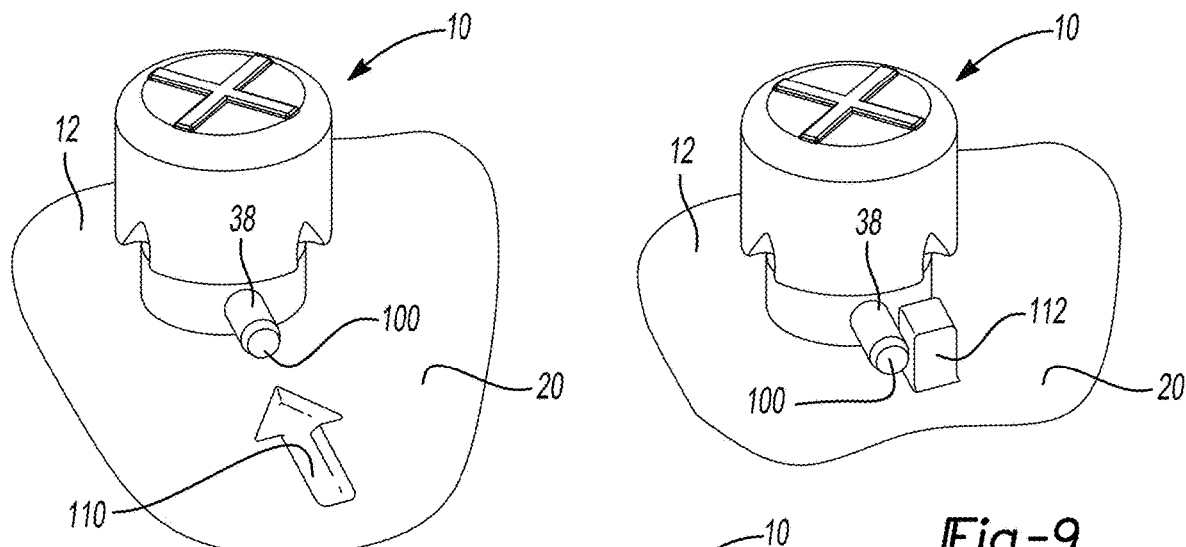
*Fig-8*
*Fig-9*
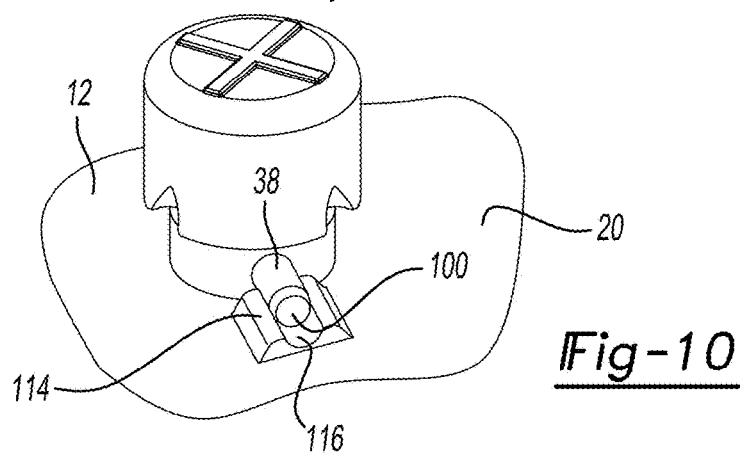
*Fig-10*

VEHICLE DRIVELINE COMPONENT WITH PINNED VENT

FIELD

The present disclosure relates to a vehicle driveline component with a pinned (breather) vent.

BACKGROUND

Breather vents are commonly employed in vehicle driveline components to permit the exchange of air between a housing and the atmosphere in situations where the differential pressure exceeds a predetermined threshold. A significant differential can develop due to heat generated during operation of the vehicle driveline component, and/or changes in the air temperature.

Modernly, it is important that lubricating fluid within the vehicle driveline component not be expelled from the breather vent during its operation. We have noted that some breather vent configurations can expel lubricating fluid from the vehicle driveline component when bubbles are formed in the lubricating fluid and those bubbles enter into the breather vent.

SUMMARY

This section provides a general summary of the disclosure, and is not a comprehensive disclosure of its full scope or all of its features.

In one form, the present disclosure provides a vehicle driveline component that includes a tubular body, a relief valve, a vent cover and a pin. The tubular body has a first and second axial ends and defines an interior circumferential surface. The relief valve is mounted in the tubular body between the first and second axial ends. The vent cover is mounted to the tubular body and covers the second axial end. The pin is mounted to the tubular body at a location between the first axial end and the relief valve. The pin extends through the interior circumferential surface into a hollow interior of the tubular body.

In some forms, the pin has a first end that is disposed outside of the tubular body. Optionally, the pin has a second, opposite end that is disposed within the hollow interior of the tubular body. Optionally, an axial end surface of the first axial end is formed at a non-perpendicular angle relative to a longitudinal axis of the tubular body. Optionally, the tubular body is mounted to a housing such that the first axial end of the tubular body is disposed in an interior cavity in the housing and the first end of the pin is aligned to the housing in a predetermined manner. Optionally, the first end of the pin is aligned to a datum feature formed on the housing. Optionally, the datum feature is a boss formed on the housing. Optionally, the boss defines a groove into which the first end of the pin is received.

In some forms, the vehicle driveline component further includes a housing that defines an interior cavity, the first axial end of the tubular body is received in the interior cavity, and the tubular body defines an attachment portion that matingly engages a mating attachment portion formed into the housing. Optionally, the attachment portion is threaded or defines one or more barbs.

In some forms, the pin is a solid pin.

In some forms, a counterbore is formed in the second axial end of the tubular body, and wherein the relief valve is mounted in the counterbore. Optionally, the counterbore defines an interior annular shoulder, the relief valve has a resilient valve element with an annular flange, and the annular flange is abutted against the interior annular shoulder. Optionally, the vehicle driveline component further includes an annular spacer that is received in the counterbore and abutted to the annular flange on a side of the annular flange that is opposite the interior annular shoulder. Optionally, the vent cover defines a plurality of vent channels that extend over the annular spacer. Optionally, the vent cover is crimped to the tubular body.

In another form, the present disclosure provides a vehicle driveline component that includes a tubular body, a relief valve, a vent cover, an annular spacer and a pin. The tubular body has first and second axial ends and a longitudinal axis. The tubular body defines an interior circumferential surface. A counterbore is formed in the second axial end of the tubular body and defines an interior annular shoulder. An axial end surface of the first axial end is formed at a non-perpendicular angle relative to the longitudinal axis. The relief valve has a resilient valve element with an annular flange. The relief valve is mounted in the counterbore such that the annular flange is abutted against the interior annular shoulder. The vent cover is mounted to the tubular body and covers the second axial end. The annular spacer is received in the counterbore and is abutted to the annular flange on a side of the annular flange that is opposite the interior annular shoulder. The pin is mounted to the tubular body at a location between the first axial end and the relief valve. The pin has a first end that is disposed outside of the tubular body. The pin extends through the interior circumferential surface into a hollow interior of the tubular body. The vent cover defines a plurality of vent channels that extend over the annular spacer and the vent cover is crimped to the tubular body.

In some forms, the pin has a second end that is disposed within the hollow interior of the tubular body. Optionally, the vehicle driveline further includes a housing that defines an interior cavity. The tubular body is mounted to the housing such that the first axial end of the tubular body is disposed in the interior cavity and wherein the first end of the pin is aligned to the housing in a predetermined manner. Optionally, the first end of the pin is aligned to a datum feature formed on the housing. Optionally, wherein the second end of the pin is abutted to a boss formed on the housing. Optionally, the boss defines a groove into which the first end of the pin is received.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a perspective view of an exemplary breather vent shown installed to the housing of an exemplary vehicle driveline component;

FIG. 2 is a section view taken along the line 2-2 of FIG. 1;

FIG. 3 is an exploded perspective view of the breather vent of FIG. 1;

FIG. 4 is a longitudinal section view of a portion of the breather vent of FIG. 1, illustrating a tubular body in more detail;

FIG. 7 is a section view taken along the line 7-7 of FIG. 1; and

FIGS. 8 through 10 are perspective views of the breather vent of FIG. 1 installed to a housing of a vehicle driveline component and aligned to various datum features formed on the housing.

Corresponding reference numerals indicate corresponding parts throughout the several views of the drawings.

DETAILED DESCRIPTION

Figure 5:
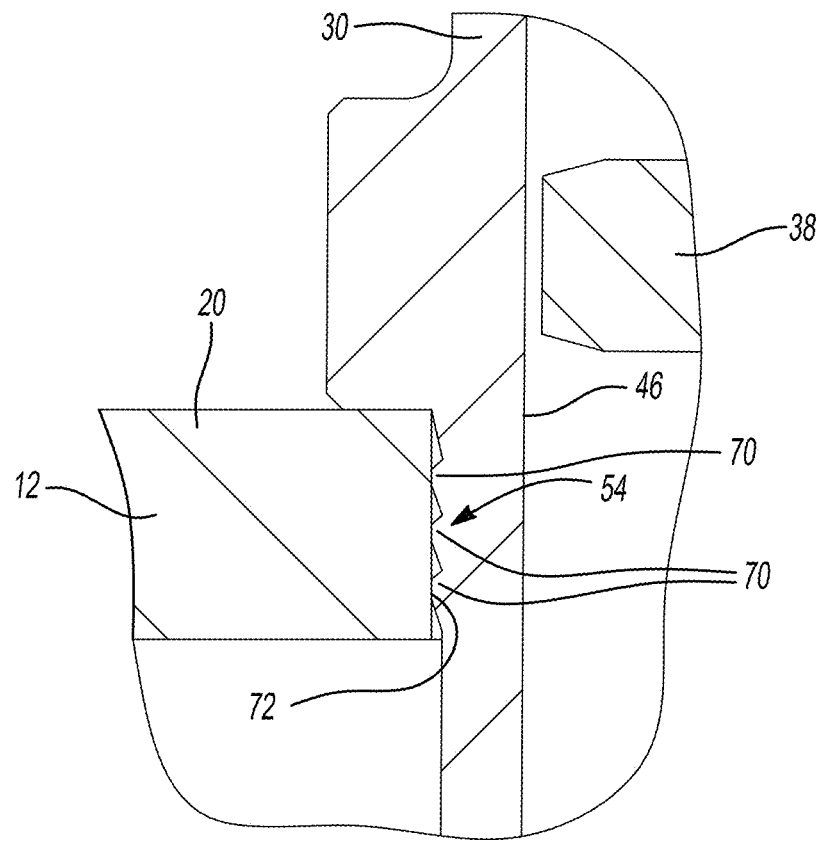
FIGS. 5 and 6 are enlarged portions of FIG. 2.

With reference to FIGS. 1 through 3, a breather vent 10 constructed in accordance with the teachings of the present disclosure is illustrated as being installed to a housing 12 of an exemplary vehicle driveline component 14. The vehicle driveline component 14 can be any type of vehicle driveline component, such as an electric drive unit, an axle assembly, a transfer case, a power take-off unit or a transmission. The housing 12 has a wall member 20 that defines an interior cavity 22. The interior cavity 22 is configured to hold a lubricating fluid for lubricating components of a rotary power transmission system (not shown). The breather vent 10 can include a tubular body 30, a relief valve 32, an annular spacer 34, a vent cover 36 and a pin 38.

With reference to FIGS. 2 and 3, the tubular body 30 can extend along a longitudinal axis 40 and can have first and second axial ends 42 and 44, respectively, an interior circumferential surface 46 and a hollow interior 48. The tubular body 30 can include a valve mount 50, pin mount 52, an attachment portion 54. The first axial end 42 of the tubular body 30 has an axial end surface 60 that can be configured in any desired manner, such as perpendicular to the longitudinal axis 40 of the tubular body 30. In the example provided, the axial end surface 60 is formed at a non-perpendicular angle relative to the longitudinal axis 40, such as a 30 degree included angle. The valve mount 50 can be formed in the second axial end 44 of the tubular body 30 and is configured to house the relief valve 32. In the example provided, the second axial end of the tubular body 30 is relatively larger in diameter than the first axial end 42, and the valve mount 50 comprises a counterbore 64 that is formed in the second axial end 44 of the tubular body 30 and which terminates at an interior annular shoulder 66. The pin mount 52 can be disposed along the longitudinal axis 40 between the first axial end 42 and the valve mount 50. The pin mount 52 can define a pin aperture 68.

With reference to FIGS. 4 and 5, the attachment portion 54 is configured to mechanically couple to the housing 12 and in the particular example provided, includes one or more circumferentially-extending barbs 70 that are received into an aperture 72 in the wall member 20 of the housing 12 and engage to the wall member 20 of the housing 12. The circumferentially-extending barb(s) 70 can optionally sealingly engage the wall member 20 of the housing 12. Alternatively, a sealant (not shown) can be employed between the wall member 20 and the tubular body 30 to form a seal, and/or a gasket (not shown), such as an O-ring, can be mounted on the tubular body 30 and engaged to the wall member 20 to form a seal.

Returning to FIGS. 2 and 3, the relief valve 32 can have any desired configuration and can be constructed in any desired manner. In general, the relief valve 32 includes a valve element 80 that can move in response to a pressure differential above a predetermined threshold to permit air to flow through the relief valve 32. In the example provided, the relief valve 32 is mounted in the counterbore 64 and includes an annular flange 82 that is disposed about the valve element 80 and abuts the interior annular shoulder 66.

The annular spacer 34 is a tubular segment. The annular spacer 34 is received in the counterbore 64 and is abutted to the annular flange 82 on a side of the annular flange 82 that is opposite the interior annular shoulder 66.

Figure 6:
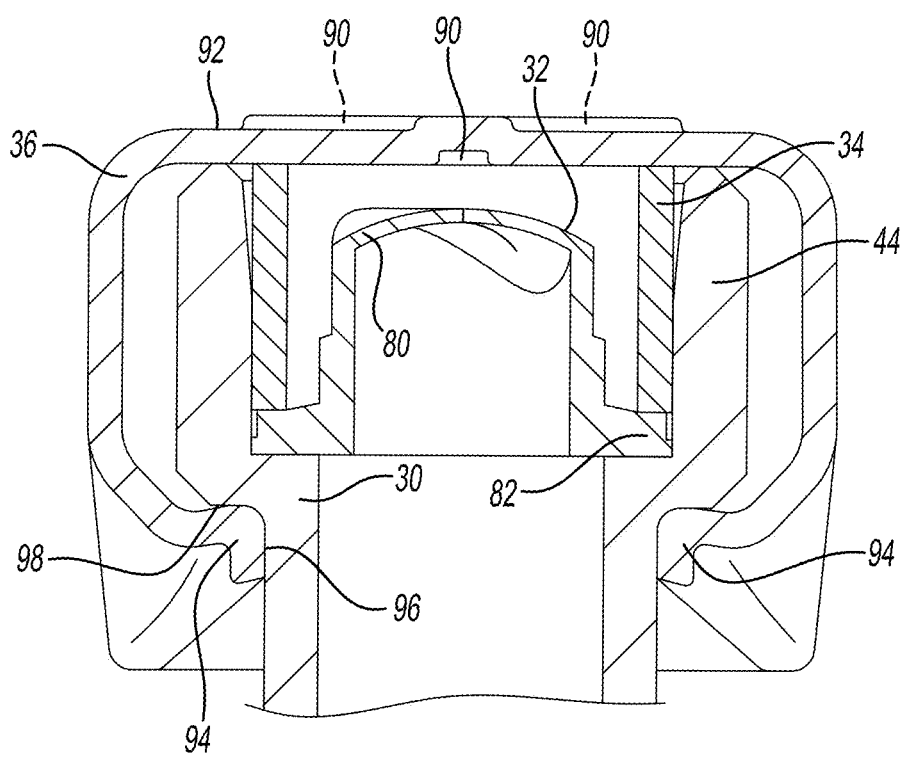

With reference to FIGS. 3 and 6, the vent cover 36 is a cup-shaped structure that is mounted to the tubular body 30 and covers the second axial end 44. One or more vent channels 90 can be formed between the annular spacer 34 and the vent cover 36. In the example provided, the vent cover 36 defines a plurality of vent channels 90 that extend over the annular spacer 34. The vent cover 36 can be formed of a suitable metallic material and the vent channels 90 can be embossed into a top section 92 of the vent cover 36. The vent cover 36 can be coupled to the tubular body 30 in any desired manner. In the example provided, a plurality of crimps 94 are formed into the vent cover 36 and couple the vent cover 36 to the tubular body 30. In this regard, the tubular body 30 can include a necked-down segment 96 that extends about the circumference of the tubular body 30 and which is disposed axially between the valve mount 50 and the pin mount 52. The vent cover 36 is crimped (i.e., to form one or more crimps 94) that fixedly retain the vent cover 36 to an annular shoulder 98 on the tubular body 30.

Returning to FIGS. 2, 3 and 7, the pin 38 is mounted to the pin mount 52 on the tubular body 30 such that the pin 38 is disposed at a location between the first axial end 42 and the relief valve 32 and the pin extends into the hollow interior 48 of the tubular body 30. The pin 38 can be received through the pin aperture 68 that can be formed in the pin mount 52. The pin 38 can extend fully across the interior circumferential surface 46 such that two distinct portions of the pin 38 are received into the material that forms the pin mount 52 and are disposed outside the hollow interior 48 of the tubular body 30. In the example provided, the first end 100 of the pin 38 is disposed outside of the tubular body 30 and the second end 102 of the pin 38 is disposed within the hollow interior 48 of the tubular body 30 (e.g., so as to touch the interior circumferential surface 46 on a side of the pin mount 52 that is opposite the pin aperture 68).

The breather vent 10 is mounted to the housing 12 such that the first axial end 42 of the tubular body 30 is disposed in the interior cavity 22, the attachment portion 54 of the tubular body 30 is fixedly coupled to the wall member 20 of the housing 12, and the vent cover 36 is disposed outside of the housing 12. In the event that a pressure differential in excess of a predetermined threshold occurs between the interior cavity 22 and the atmosphere, the relief valve 32 can open to permit air to flow through the breather valve 10 between the interior cavity 22 and the atmosphere. If a lubricant bubble enters into the first axial end 42 of the tubular body 30, contact between the pin 38 and the lubricant bubble will cause the lubricant bubble to burst so that the lubricant bubble is not able to travel to the relief valve 32. Consequently, lubricant bubbles are not able to force lubricant out of the breather vent 10.

The pin 38 can be employed to align the breather vent 10 to the housing 12 in situations where the first end 100 of the pin 38 is disposed outside of (i.e., extends away from) the tubular body 30. In this regard, the first end 100 of the pin 38 can be aligned to the housing 12 in a predetermined manner, such as to a datum feature formed on the housing 12. In the example of FIG. 8, the datum feature is an alignment mark 110 that is formed into the housing 12. The alignment mark 110 could be stamped into or cast onto the wall member 20 of the housing 12 and could be used as a visual reference for alignment of the first end 100 of the pin 38. In the example of FIG. 9, the datum feature is a boss 112 that is formed on the housing 12 and the pin 38 is abutted against the boss 112. In the example of FIG. 10, the boss 114 defines a groove 116 and the first end 100 of the pin 38 is received in the groove 116 in the boss 114.

With reference to FIG. 2, alignment of the breather vent 10 to the housing 12 in a desired manner can orient the axial end surface 60 of the first axial end 42 of the tubular body 30 in a desired manner, such as facing away from a rotating component that splashes or churns lubricant within the interior cavity 22 of the housing 12 toward the tubular body 30.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle driveline component comprising:
a tubular body having a first axial end and a second axial end, the tubular body defining an interior circumferential surface;
a relief valve mounted in the tubular body between the first and second axial ends;
a vent cover mounted to the tubular body and covering the second axial end, the vent cover having one or more channels that vent a space in the tubular body between the relief valve and a first side of the vent cover that faces the relief valve to the atmosphere; and
a pin mounted to the tubular body at a location between the first axial end and the relief valve, the pin extending through the interior circumferential surface into a hollow interior of the tubular body.

2. The vehicle driveline component of claim 1, wherein the pin has a first end that is disposed outside of the tubular body.

3. The vehicle driveline component of claim 2, wherein the pin has a second end that is disposed within the hollow interior of the tubular body.

4. The vehicle driveline component of claim 2, wherein the tubular body has a longitudinal axis and wherein an axial end surface of the first axial end is formed at a non-perpendicular angle relative to the longitudinal axis.

5. The vehicle driveline component of claim 4, further comprising a housing, the housing defining an interior cavity, wherein the tubular body is mounted to the housing such that the first axial end of the tubular body is disposed in the interior cavity and wherein the first end of the pin is aligned to the housing in a predetermined manner.

6. The vehicle driveline component of claim 5, wherein the first end of the pin is aligned to a datum feature formed on the housing.

7. The vehicle driveline component of claim 5, wherein the first end of the pin is abutted to a boss formed on the housing.

8. The vehicle driveline component of claim 7, wherein the boss defines a groove into which the first end of the pin is received.

9. The vehicle driveline component of claim 1, further comprising a housing that defines an interior cavity, wherein the first axial end of the tubular body is received in the interior cavity, and wherein the tubular body defines an attachment portion that matingly engages a mating attachment portion formed into the housing.

10. The vehicle driveline component of claim 9, wherein the attachment portion is threaded.

11. The vehicle driveline component of claim 9, wherein the attachment portion defines one or more barbs.

12. The vehicle driveline component of claim 1, wherein the pin is a solid pin.

13. The vehicle driveline component of claim 1, wherein a counterbore is formed in the second axial end of the tubular body, and wherein the relief valve is mounted in the counterbore.

14. The vehicle driveline component of claim 13, wherein the counterbore defines an interior annular shoulder, and wherein the relief valve has a resilient valve element with an annular flange, the annular flange being abutted against the interior annular shoulder.

15. The vehicle driveline component of claim 14, further comprising an annular spacer that is received in the counterbore and abutted to the annular flange on a side of the annular flange that is opposite the interior annular shoulder.

16. The vehicle driveline component of claim 15, wherein the vent cover defines a plurality of vent channels that extend over the annular spacer.

17. The vehicle driveline component of claim 16, wherein the vent cover is crimped to the tubular body.

18. A vehicle driveline component comprising:
a tubular body having a first axial end and a second axial end and a longitudinal axis, the tubular body defining an interior circumferential surface, wherein a counterbore is formed in the second axial end of the tubular body, the counterbore defining an interior annular shoulder, wherein an axial end surface of the first axial end is formed at a non-perpendicular angle relative to the longitudinal axis;
a relief valve having a resilient valve element with an annular flange, the relief valve being mounted in the counterbore such that the annular flange being abutted against the interior annular shoulder;
a vent cover mounted to the tubular body and covering the second axial end;
an annular spacer that is received in the counterbore and abutted to the annular flange on a side of the annular flange that is opposite the interior annular shoulder; and
a pin mounted to the tubular body at a location between the first axial end and the relief valve, the pin has a first end that is disposed outside of the tubular body, the pin extending through the interior circumferential surface into a hollow interior of the tubular body;
wherein the vent cover defines a plurality of vent channels that extend over the annular spacer and wherein the vent cover is crimped to the tubular body.

19. The vehicle driveline component of claim 18, wherein the pin has a second end that is disposed within the hollow interior of the tubular body.

20. The vehicle driveline component of claim 18, further comprising a housing, the housing defining an interior cavity, wherein the tubular body is mounted to the housing such that the first axial end of the tubular body is disposed in the interior cavity and wherein the first end of the pin is aligned to the housing in a predetermined manner.

21. The vehicle driveline component of claim 20, wherein the first end of the pin is aligned to a datum feature formed on the housing.

22. The vehicle driveline component of claim 20, wherein the first end of the pin is abutted to a boss formed on the housing.

23. The vehicle driveline component of claim 22, wherein the boss defines a groove into which the first end of the pin is received.

* * * * *